M. URASE.
DEVICE FOR TEACHING WRITING.
APPLICATION FILED NOV. 4, 1914.
1,136,450. Patented Apr. 20, 1915.
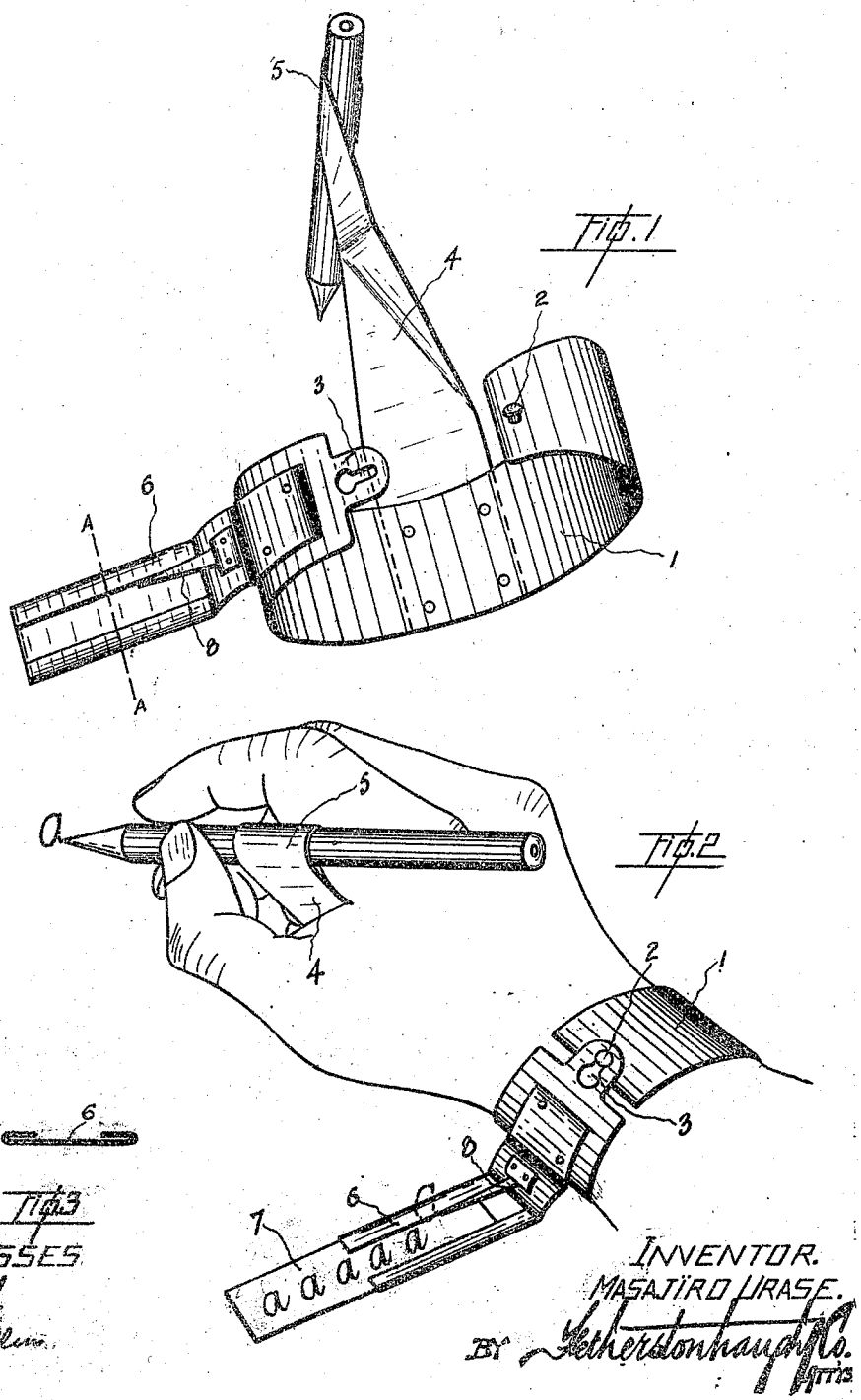
INVENTOR.
MASAJIRO URASE.
WITNESSES

UNITED STATES PATENT OFFICE.

MASAJIRO URASE, OF STEVESTON, BRITISH COLUMBIA, CANADA.

DEVICE FOR TEACHING WRITING.

1,136,450.   Specification of Letters Patent.   Patented Apr. 20, 1915.

Application filed November 4, 1914. Serial No. 870,292.

*To all whom it may concern:*

Be it known that I, MASAJIRO URASE, a subject of the King of Great Britain, and a resident of the town of Steveston, in the Province of British Columbia, Canada, have invented certain new and useful Improvements in Devices for Teaching Writing, of which the following is a specification.

My invention relates to devices for teaching writing, and the object of my invention is the provision of a cheap and simple device to be used for the purpose of teaching writing by muscular movement, which movement, be it understood, as applied to writing, is the control of the hand by the movement of the muscles of the arm from the shoulder to the wrist with the larger part of the arm below the elbow resting on the desk, the fingers not being held rigid as in the present method of writing but remaining passive, and the propelling power being located behind the elbow in the upper muscles of the arm.

I attain this object by the means illustrated in the accompanying drawings in which—

Figure 1 is a perspective view of my device. Fig. 2 is a view illustrating how my device is used. Fig. 3 is a section on the line A—A in Fig. 1.

Similar figures of reference indicate similar parts throughout the several views.

My device may be constructed of any suitable material, such as aluminum, and preferably as shown in Fig. 1.

1 is a wrist ring or band, adapted to spring over the wrist of the pupil, and having a button or stud 2 secured on one end, which button is adapted to pass through a slot 3 in the opposite end so as to secure the band 1 in place on the wrist, as shown in Fig. 2.

4 is the pencil supporter, secured at one end to the band 1 and extending outwardly therefrom a suitable distance and having its outer end turned over, as shown at 5, so as to grip the pencil firmly, yet slidably, when same is engaged thereby.

6 is a holder having a cross section as shown in Fig. 3, which holder is secured to the wrist band 1 and is provided for the purpose of holding a model letter chart 7 on which are printed, for the guidance of the pupil, model letters, for instance, as indicated by *a* in Fig. 2, the formation of which it is desired to copy.

8 is a pointer, also secured to the wrist band 1, to which pointer the motion of forming the model letters is imparted by the muscular movement of the arm.

The manner in which my device is used will be apparent on reference being made to Fig. 2, and may be described as follows:— The wrist band 1 is secured over the wrist, as shown in Fig. 2, the pencil supporter 4, carrying a pencil, then lying in the palm of the hand. The pencil is then in position to be gripped by the fingers. The model letter chart 7 may then be placed in the holder 6. The pencil point now being held on a sheet of paper with the fingers passive, and the eyes directed to the point of the pointer 8, the arm is moved so as to cause the end of the pointer to form imaginatively the letter, the model of which is shown on the chart. The pencil point moving on the paper simultaneously with the end of the pointer, a letter similar to the model letter on the chart is thus written on the sheet, the complete movement being accomplished without finger or wrist action, but by the movement of the muscles of the arm.

It will be seen, therefore, that by the use of my device the muscles of the arm may be trained to acquire the motion of letter forming so that the habit of letter writing by muscular movement may be established.

It may be mentioned that, while it is not absolutely necessary to attach the model letter chart to the device as shown, the provision of the holder makes for greater convenience during the practice of letter forming and further, when held parallel to the lower edge of the paper on which the letters are transcribed, serves as a guide to write the letters straight. It will be understood, of course, that the device may be dispensed with after the pupil has been sufficiently trained.

What I claim as my invention is:

1. A device for teaching writing, comprising a divided ring adapted to encircle the wrist and to be detachably secured therearound, said ring having an outwardly extending finger on one side thereof and approximately at right angles thereto and a forwardly extending portion the extremity of which is adapted to receive and hold a pencil.

2. A device for teaching writing, comprising a divided ring adapted to encircle the wrist and to be detachably secured therearound, said ring having an outwardly extending finger on one side thereof and approximately at right angles thereto and a forwardly extending portion the extremity of which is adapted to hold a pencil, and a member secured to the said ring and extending outwardly therefrom below and adjacent the said finger, said member being adapted to slidably receive a letter chart.

3. A device for teaching writing, comprising a divided ring having a slot near one end and a button near the opposite end designed to engage the said slot so as to secure the said ring on the wrist, a finger secured to the ring on one side thereof and approximately at right angles thereto, a member secured to the said ring on the same side as the said finger below and adjacent thereto, said member being adapted to slidably receive a letter chart, and a pencil supporting member the outer extremity of which is adapted to hold a pencil, said member being secured at its inner end to said ring and extending forwardly so as to support the pencil at a suitable distance therefrom.

4. A device for teaching writing comprising a pointer attached to the wrist so as to extend laterally therefrom, and a writing instrument supporting member attached to the wrist at one end and extending through the hand gripping the writing instrument so as to engage and support such instrument.

Dated at Vancouver, B. C., this 20th day of October, 1914.

MASAJIRO URASE.

Witnesses:
 JAMES TAYLOR,
 MARGARET TAYLOR.